United States Patent [19]

Watanabe et al.

[11] Patent Number: 5,793,902
[45] Date of Patent: Aug. 11, 1998

[54] CHARACTER INFORMATION PROCESSOR

[75] Inventors: Kenji Watanabe; Takanobu Kameda; Chieko Aida; Tomoyuki Shimmura, all of Tokyo; Yoshiya Toyosawa, Suwa; Hiroyasu Kurashina, Suwa; Takeshi Hosokawa, Suwa, all of Japan

[73] Assignees: King Jim Co., Ltd.; Seiko Epson Corporation, both of Japan

[21] Appl. No.: 568,445

[22] Filed: Dec. 7, 1995

[30] Foreign Application Priority Data

Dec. 7, 1994 [JP] Japan ................. 6-303668

[51] Int. Cl.$^6$ .................................................. G06K 9/32
[52] U.S. Cl. .......................... 382/298; 382/293; 395/102; 395/138; 395/139; 400/62
[58] Field of Search .......................... 382/293, 298; 395/102, 139, 138; 400/62; 345/26, 128, 129, 130

[56] References Cited

U.S. PATENT DOCUMENTS 4,875,173  10/1989  Nakajima .................. 382/298
5,492,420   2/1996  Nunokawa et al. ......... 400/62

FOREIGN PATENT DOCUMENTS 63-287893  11/1988  Japan .
 6115167    4/1994  Japan .
 6118934    4/1994  Japan .

OTHER PUBLICATIONS

English Abstracts for Japanese 6–115167.
English Abstract for Japanese 6–118934.

*Primary Examiner*—Leo Boudreau
*Assistant Examiner*—Daniel G. Mariam
*Attorney, Agent, or Firm*—Lorusso & Loud

[57] ABSTRACT

A processor for a tape printer enables user-generated characters each formed by dot patterns in four sizes (16×16 dots, 24×24 dots, 32×32 dots, 48×48 dots). The user generates the dot pattern of the smallest size (16×16 dots) and the processor automatically enlarges the generated dot pattern to tentative dot patterns in the three larger sizes which can then be modified in turn by the user. Upon completion of the modification of the second size pattern (24×24 dots) the processor enlarges the completed second size dot pattern to a substitute fourth size tentative dot pattern (48×48 dots) to incorporate the modifications of the second size dot pattern into the fourth size dot pattern and thus reduce the user modifications to the fourth size dot pattern.

8 Claims, 11 Drawing Sheets

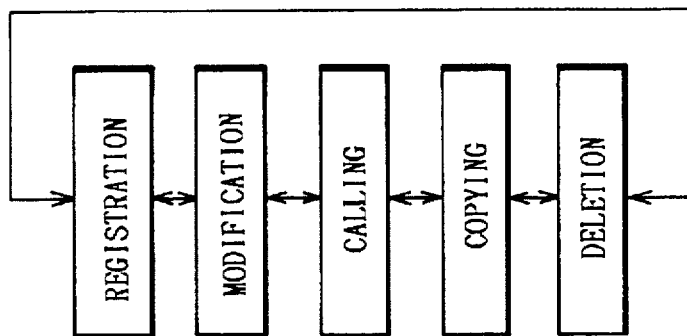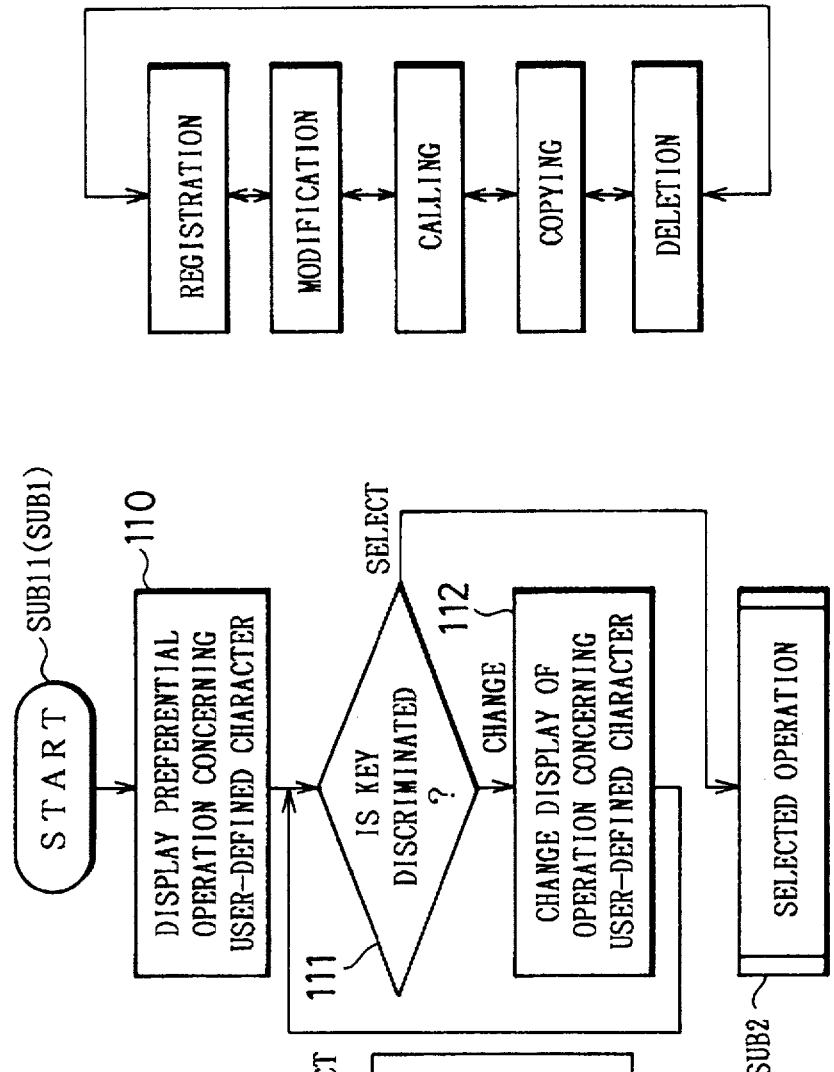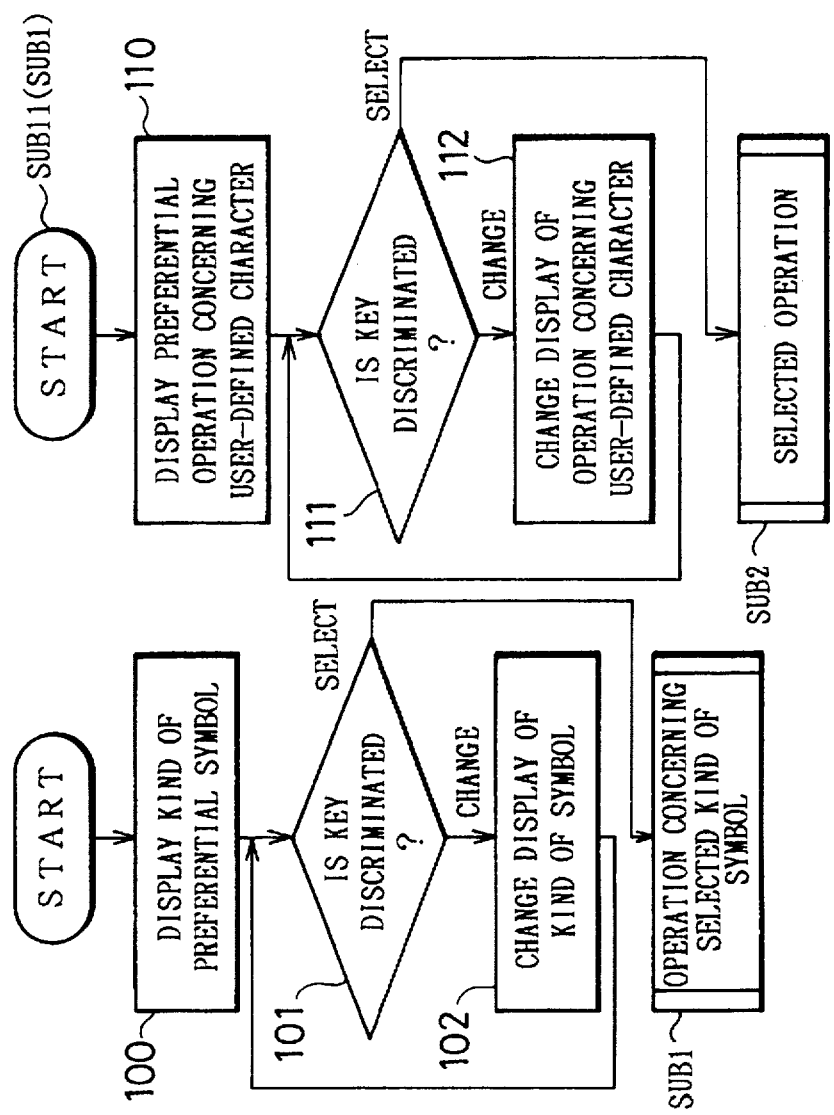

METHOD FOR GENERATING 24×24 DOT PATTERN

F I G. 1 1(A)
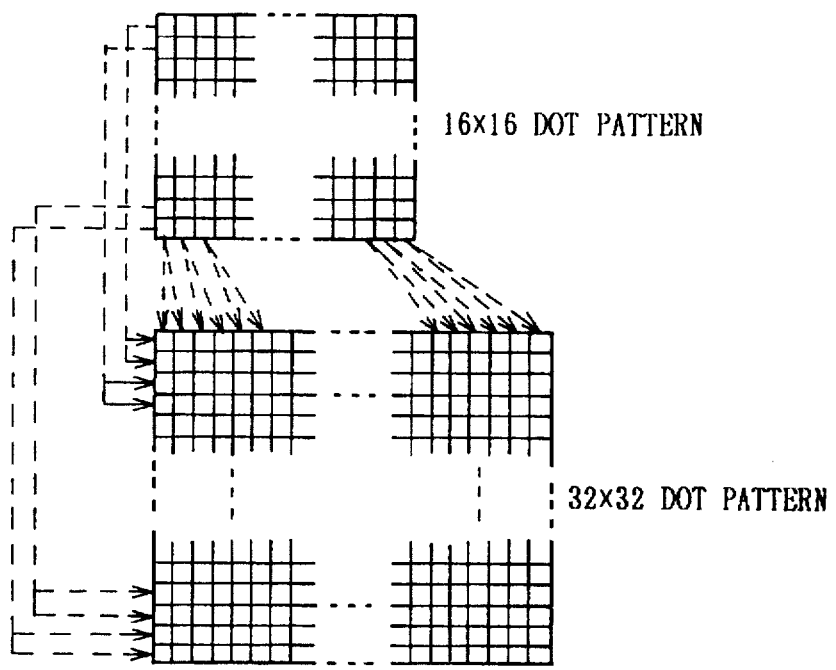
METHOD FOR GENERATING 32×32 DOT PATTERN
F I G. 1 1(B)
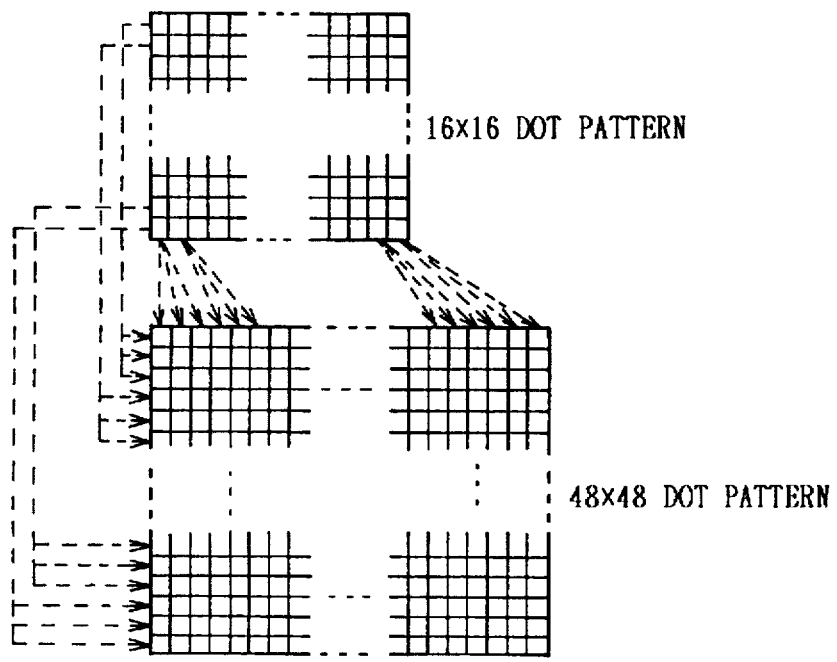
METHOD FOR GENERATING 48×48 DOT PATTERN

CHARACTER INFORMATION PROCESSOR

BACKGROUND OF THE INVENTION

1. Field of the Invention

The present invention relates to a character information processor endowed with a function of registering characters and symbols (hereunder referred to as user-defined characters (or external characters)) which are not provided therein. Further, the present invention can be applied to, for example, a device for printing characters on tape (hereunder referred to simply as a tape printing device), which uses tape as a printing medium, and a seal making device in which a transfer medium (or printing medium) is the face of a carved seal.

2. Description of the Related Art

Many character information processors have the function of registering user-defined characters in consideration of the difficulty in practically preparing and supporting all characters and symbols (hereunder sometimes referred to generically as characters) used in the real world. Namely, the character information processors have the function, by which users can register a dot pattern representing a user-defined characters, which is not provided therein preliminarily. therein, if necessary. For example, in the case of a tape printing device which is a compact device, there is a limit to the memory capacity thereof owing to the size reduction thereof. Thus the number of characters provided in the processor is small in comparison with the case of a large-size device. Therefore, the function of registering user-defined characters is important for the character information processor. Further, in the case of a tape printing device, printed or outputted tape is often used as a label. Moreover, users frequently use a given symbol such as a logotype. Thus the function of registering user-defined characters is important therefor in this respect.

In the case of such a conventional tape printing device, the following method of registering a user-defined character is employed.

Namely, when an operation of registering a user-defined character is selected, an N-by-N dot pattern (namely, a matrix N dots wide by N dots high) for generating a user-defined character, all dots of which are initially treated as background dots, is displayed in a background color of a display portion or unit (incidentally, N is for instance, 16, 24, 32 or 48). Moreover, one of dots is displayed as an object dot to be operated. If a user operates a cursor moving key when the display unit is in such a state, the object dot to be operated is changed. Further, if the user operates a dot-on key, the object dot to be operated is inverted and displayed as one of dots composing a user-defined character. Thereafter, if a key for defining a user-defined character is operated in a state in which one or more dots are selected as the dots composing a user-defined character, the entire N-by-N dot pattern in this stage is definitely registered as representing a user-defined character.

Meanwhile, in the case of a tape printing device, outputted tape, on which characters are printed, is often used as a label. Further, it frequently occurs that characters of different sizes are printed on same tape. For example, it is often that a title is printed in large characters, while additional and supplementary descriptions are printed in small characters, and that the name of a company is printed in large characters, while the address and the telephone number thereof are printed in small characters. Therefore, a plurality of dot patterns of different sizes are arranged for each of characters preliminarily provided in the device. Thus, a plurality of dot patterns of different sizes should be registered therein correspondingly to each user-defined character. Namely, it is necessary to register, for instance, four kinds of dot patterns whose sizes are 16×16 dots, 24×24 dots, 32×32 dots and 48×48 dots.

Here, if the plurality of dot patterns of different sizes are serially generated, it takes extremely long time to register one user-defined character. Moreover, it is difficult for the user to generate or define a user-defined character in such a manner as to uniform the shapes of the user-defined character, which are respectively represented by the plurality of dot patterns of different sizes. In view of these respects, the Applicants of the instant application have already proposed a method, in which an already-generated dot pattern of a size smaller than the size of an object dot-pattern to be generated is converted by being enlarged to the size of the object dot-pattern when a dot pattern of a size larger than the smallest one of the different sizes is the object dot-pattern to be generated, and in which the object dot-pattern is generated by displaying the enlarged dot pattern as the dot pattern for generating a user-defined character, in the Japanese Patent Application Laying-Open No. 6-115167/1994.

In the case of registering, for example, the four kinds of dot patterns, whose sizes are 16×16 dots, 24×24 dots, 32×32 dots and 48×48 dots, by performing this method, if the dot pattern of the size of 16×16 dots is definitely determined, the dot patterns of the sizes, which are 24×24 dots, 32×32 dots and 48×48 dots, are generated by performing the enlargement conversion operation and are tentatively defined. Then, such dot patterns of the sizes, which are 24×24 dots, 32×32 dots and 48×48 dots, are displayed in sequence. If necessary, such dot patterns are corrected by a user. Thus, these dot patterns can be definitely determined and registered.

This method is preferable in that even if a user defines only the dot pattern of the size of 16×16 dots but instructs the device to finish the registration of a user-defined character, all of the four kinds of dot patterns are provided and thus the registration is accepted.

When, however, a user utilizes this method, the user usually comes to correct the tentatively defined dot patterns of the sizes, which are 24×24 dots, 32×32 dots and 48×48 dots. Although the volume of processing required in this case is relatively small in comparison with that of processing required in the case where all of these dot patterns are generated by selecting all composing dots thereof from the dot pattern for generating a user-defined character, the number of dots to be corrected by the user by turning on or off is still large. Note that for instance, the total number of dots composing the 48×48 dot pattern is 2304. It is, accordingly, required to further improve the operability of the device.

Moreover, a printed matter produced by a tape printing device is frequently used as a label. Thus, pictures and symbols are often used as user-defined characters. Further, some pictures and symbols contain a large proportion of filled-in regions. In the cases of such user-defined characters, the number of turning-on or turning-off of dots is larger than that of the cases of other user-defined characters. As a result, an operation of generating dot patterns corresponding to such a user-defined character becomes complex. It is, therefore, required to further enhance the operability of the device.

Meanwhile, in the case of a tape printing device which is a compact character information processor, the display surface (namely, the screen) thereof has a small area. Consequently, in the cases of most of such tape printing devices, one dot of the screen corresponds to one dot of a dot pattern representing a user-defined character. Therefore, even if an object dot to be operated is displayed by being, for example, blinked in such a way as to be able to be discriminated from other dots, a user is liable to closely watch such a small point or dot. Thus, it becomes difficult for a user to pay attention to the position of such a small dot in the entire dot pattern.

The aforementioned problem of operability concerning the registration of a user-defined character and the modification of a dot pattern comes up not only in the tape printing device but also in other character information processors which have user-defined character registering functions similar to those of the tape printing device. Namely, a similar problem crops up in, for example, a seal making device adapted to use a resin having a part, which is hardened at the time of receiving ultraviolet radiation and is left over after the other part is removed by the action of a predetermined fluid, as the face of a seal, which is carved by being irradiated with light rays corresponding to input characters (this is a transferring operation, and in the specification of the instant application, the term "printing" includes the concept of "transferring").

The present invention is accomplished to solve the aforementioned problems of the conventional character information processors.

Accordingly, an object of the present invention is to provide a character information processor whose operability concerning the registration of a user-defined character and the modification of a dot pattern is further improved.

SUMMARY OF THE INVENTION

To achieve the foregoing object, in accordance with an aspect of the present invention, there is provided a character information processor for generating and registering dot patterns of a plurality of sizes representing a user-defined character unprovided therein. In the case of this processor, when the dot patterns of the sizes larger than the smallest one of the plurality of sizes are object dot patterns to be generated, the object dot pattern of predetermined one of the sizes is generated by enlarging an already-generated dot pattern of a size smaller than a size of a current object dot pattern to the size of the current object dot pattern and next displaying the enlarged dot pattern and subsequently, modifying the displayed dot pattern. This character information processor is characterized by comprising dot pattern generating means for generating a current object dot pattern of one of the sizes in response to an operation performed by a user, and enlargement conversion means for performing an enlargement conversion from an already generated dot pattern of one of the sizes to a tentative dot pattern of a size larger than the size of the already generated dot pattern. The tentative dot pattern of the larger size is employed as an initial dot pattern of the larger size to be used at the time of starting the generation of a definite dot pattern of the larger size. This character information processor is characterized by further comprising control means for causing the enlargement conversion means to further perform an enlargement conversion from the definite dot pattern to a dot pattern of a further larger size if the size of the definite dot pattern is the predetermined size in the case where the dot pattern generating means finishes generating the dot pattern of the larger size by modifying the initial dot pattern having been once enlarged, whereby an initial dot pattern of the further larger size to be used at the time of starting the generation of the definite dot pattern of the further larger size is further provided.

Thereby, a user can generate a dot pattern of a predetermined size by performing a modification operation on the tentative dot pattern. Further, a user has only to correct or modify the tentative dot pattern which has been once generated from the dot pattern by taking into account information concerning a correction or modification made thereon. Thus, a user can easily generate a definite dot pattern. Consequently, the processor, whose operability is further improved, can be realized.

Further, in accordance with another aspect of the present invention, there is provided a character information processor adapted to generate and register a dot pattern representing a user-defined character unprovided therein. This character information processor is characterized by comprising first user-defined character dot-pattern edition means for editing the dot pattern representing the user-defined character by changing each of dots of the dot pattern representing the user-defined character into an "on-dot" or an "off-dot", second user-defined character dot-pattern edition means for editing the dot pattern representing the user-defined character by collectively changing all dots of a designated area of the dot pattern representing the user-defined character into "on-dots", and third user-defined character dot-pattern edition means for editing the dot pattern representing the user-defined character by collectively changing all dots of a designated area of the dot pattern representing the user-defined character into "off-dots".

Thus, a user comes to be able to easily perform operations of registering and modifying a picture and a symbol, which contain a large portion of filled-in areas. Thereby, the processor, whose operability is further improved, can be realized.

Moreover, in accordance with still another aspect of the present invention, there is provided a character information processor adapted to generate and register a dot pattern representing a user-defined character unprovided therein. This character information processor is characterized by comprising display control means for displaying a drawing display area, on which the dot pattern is drawn, and an outer display area provided on the outside of the drawing display area by distinguishing the drawing display area from the outer display area and for displaying a portion, which is located in the outer display area, of each of vertical and lateral segments, which pass through a cursor representing an object dot to be operated in the drawing display area, as a cursor guide.

Thereby, a user can achieve the visual recognition of the position of the cursor easily and accurately in the entire dot pattern, without paying attention only to the vicinity of the cursor. As a result, the device comes to be easily operated. Consequently, the device, whose operability is further improved, can be realized.

Here, note that in the case of this character information processor, preferably, the display control means can change a size of the drawing display area according to a size of the dot pattern to be generated, because this facilitates to the recognition of the dot pattern according to the size thereof.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIGS. 4(A), 4(B) and 4(C) are flowcharts for illustrating procedures used in performing operations concerning user-defined characters in the embodiment of the present invention;

FIGS. 11(A) and 11(B) are diagrams for illustrating other exemplary cases of the enlargement conversion operation to be performed on a dot pattern in the embodiment of the present invention.

DETAILED DESCRIPTION OF THE PREFERRED EMBODIMENTS

Hereinafter, the preferred embodiments of the present invention will be described in detail by referring to the accompanying drawings.

(A) Configuration of Entire Electrical System of Embodiment

First, the configuration of the entire electrical system of a tape printing device embodying the present invention, namely, an embodiment of the present invention will be described by referring to a functional block diagram of FIG. 2. In the case of this embodiment, four sizes, namely, 16×16 dots, 24×24 dots, 32×32 dots and 48×48 dots are employed as the object sizes of dot patterns to be stored therein correspondingly to each of characters which include user-defined characters.

Figure 2:
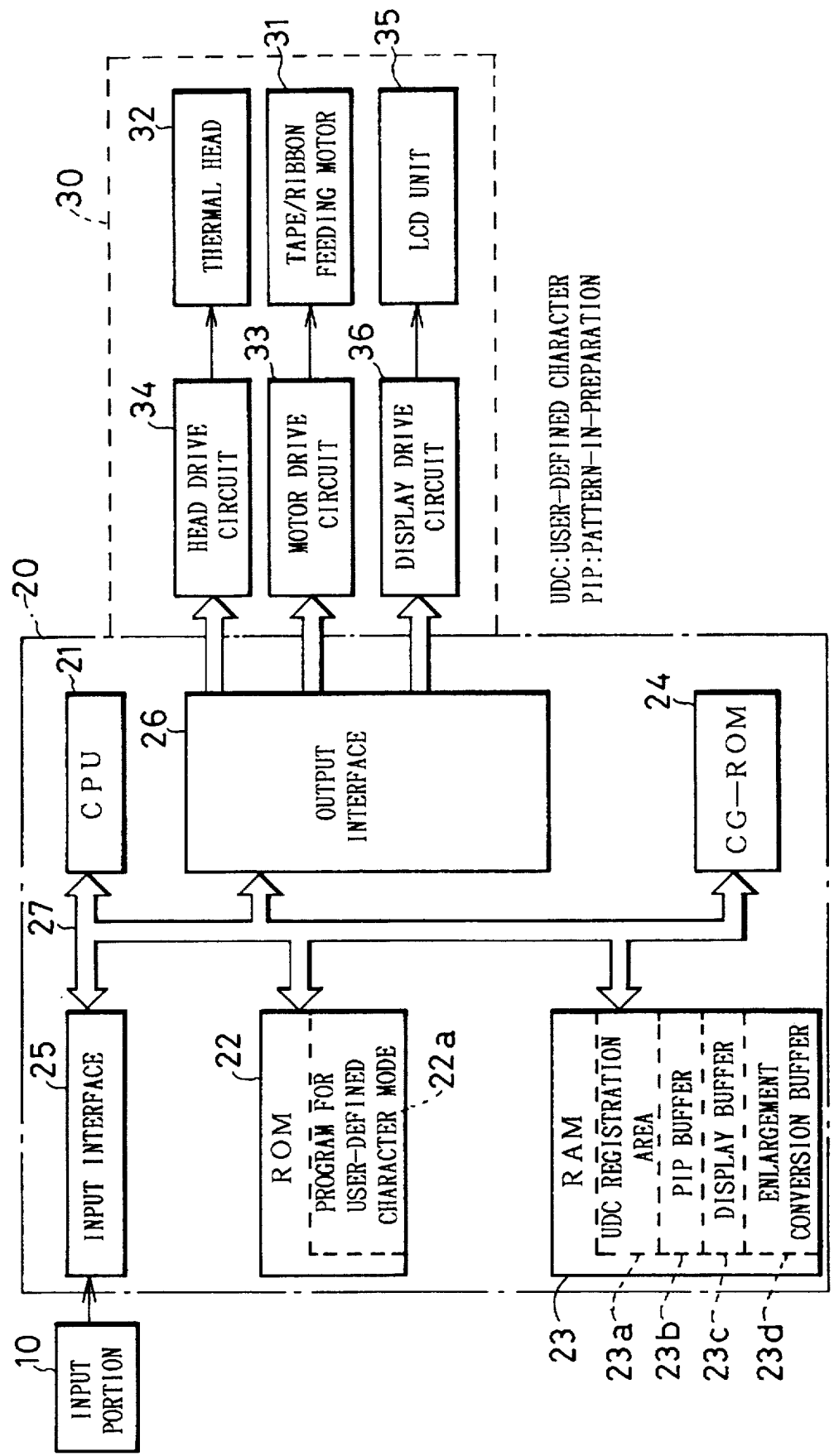
FIG. 2 is a block diagram for illustrating the configuration of an electrical system of the embodiment of the present invention.

As shown in FIG. 2, roughly speaking, the tape printing device of this embodiment is composed of an input portion 10, a control portion 20 and an output portion 30, similarly as other information processors. Further, character information input to the input portion 10 is output by being displayed or printed in the output portion 30 under the control of the control portion 20.

The input portion 10 is provided with pushdown keys, a dialing key and so on and is operative to generate character code data and various kinds of control data to be supplied to the control portion 20 (the detail description of the configuration thereof is omitted herein for the simplicity of description). Further, in the case of the tape printing device according to this embodiment, the input portion 10 is provided with various kinds of keys concerning the function of registering a user-defined character (these keys may be also used as keys used for realizing other functions).

The output portion 30 is composed of print elements and display elements. Further, a tape/ribbon feeding motor 31, which may consist of, for instance, a stepping motor, is operative to feed tape or an ink ribbon (not shown) loaded in the tape printing device to a predetermined printing position or to the outside thereof. Moreover, a thermal head 32 is operative to print characters on the tape running thereon by performing what is called a thermal transfer printing. For example, the thermal head 32 can simultaneously print 128 dots at the maximum. The tape/ribbon feeding motor 31 and the thermal (print) head 32 are driven by a motor drive circuit 33 and a head drive circuit 34, respectively, under the control of the control portion 20. A user-defined character registered in the aftermentioned way can be printed on the tape. The cutting of the printed tape is performed by using a cutter (not shown) which is driven by, for example, external forces exerted by a user or is automatically driven by the control portion 20.

In case of the tape printing device according to this embodiment, a liquid crystal display (LCD) unit 35, on which, for instance, a few lines of several characters of the minimum size can be displayed, is provided therein as a display portion. This LCD unit 35 is driven by a display drive circuit 36 under the control of the control portion 20 and is operative to display a sequence of input characters and is also operative to turn on indicators on the screen thereof, which indicators respectively correspond to items of attributes represented by sequences of characters printed on the surface of the circumference portion of the screen thereof. When performing an operation of registering a user-defined character, a "dot-pattern generating screen" (of FIG. 5) for generating a dot pattern, which represents a user-defined character, is displayed on the screen of the LCD unit 35.

Figure 3:
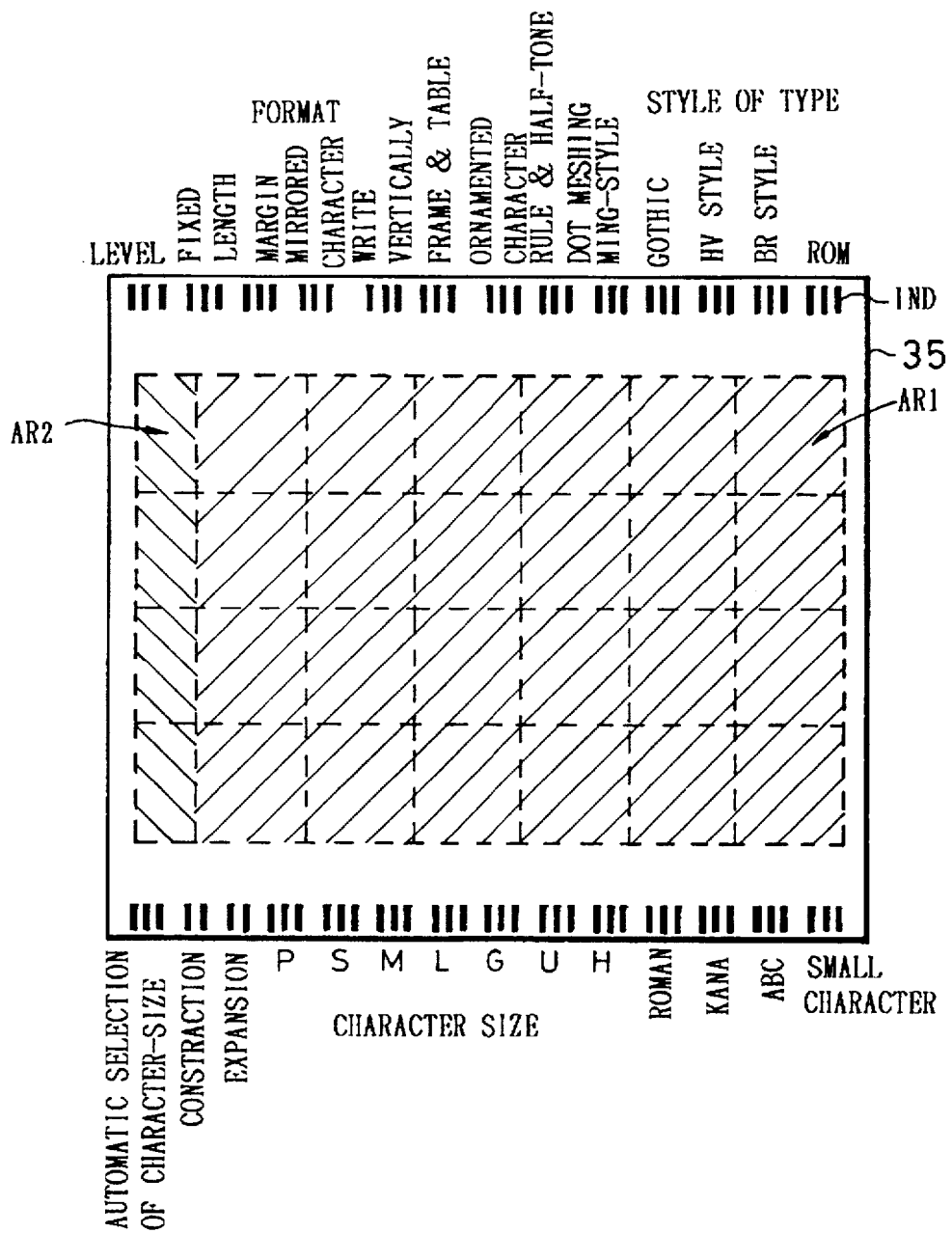
FIG. 3 is a diagram for illustrating a screen layout of a liquid crystal display unit of the embodiment of the present invention.

FIG. 3 illustrates an example of the arrangement (namely, the screen layout) of display elements to be displayed on the screen of the LCD 35. This embodiment is adapted to permit a user to input a relatively large number of lines (for example, a maximum of 8 lines) of characters thereto. Thus, in the case of this embodiment, an area sufficient to display 4 lines of 6 characters (a character corresponds to 16×16 dots), which is larger than a corresponding area in the case of the conventional device, is provided on the screen as an area AR1 on which input characters can be displayed. Moreover, a line-number displaying area AR2 for distinguishing among lines is provided on the screen. Furthermore, the LCD unit 35 is provided with indicators IND for indicating whether the attributes represented by the sequences of the characters are in on- or off-states. Namely, the LCD unit 35, whose display screen is larger than that in the case of the conventional device, is employed in the case of this embodiment. Thus, a dot pattern of the maximum size, namely, a 48×48 dot pattern can be displayed at a time in the case where dots of a dot pattern representing a user-defined character are respectively assigned to dots provided on the screen of the LCD unit 35 in a one-to-one relationship when registering the user-defined character.

The control portion 20 is constituted by, for example, a microcomputer. Further, the control portion 20 has a structure in which a central processing unit (CPU) 21, a read-only memory (ROM) 22, a random access memory (RAM) 23, a character-generator ROM (CG-ROM) 24, an input interface portion 25 and an output interface portion 26 are connected with one another through a system bus 27.

Figure 1:
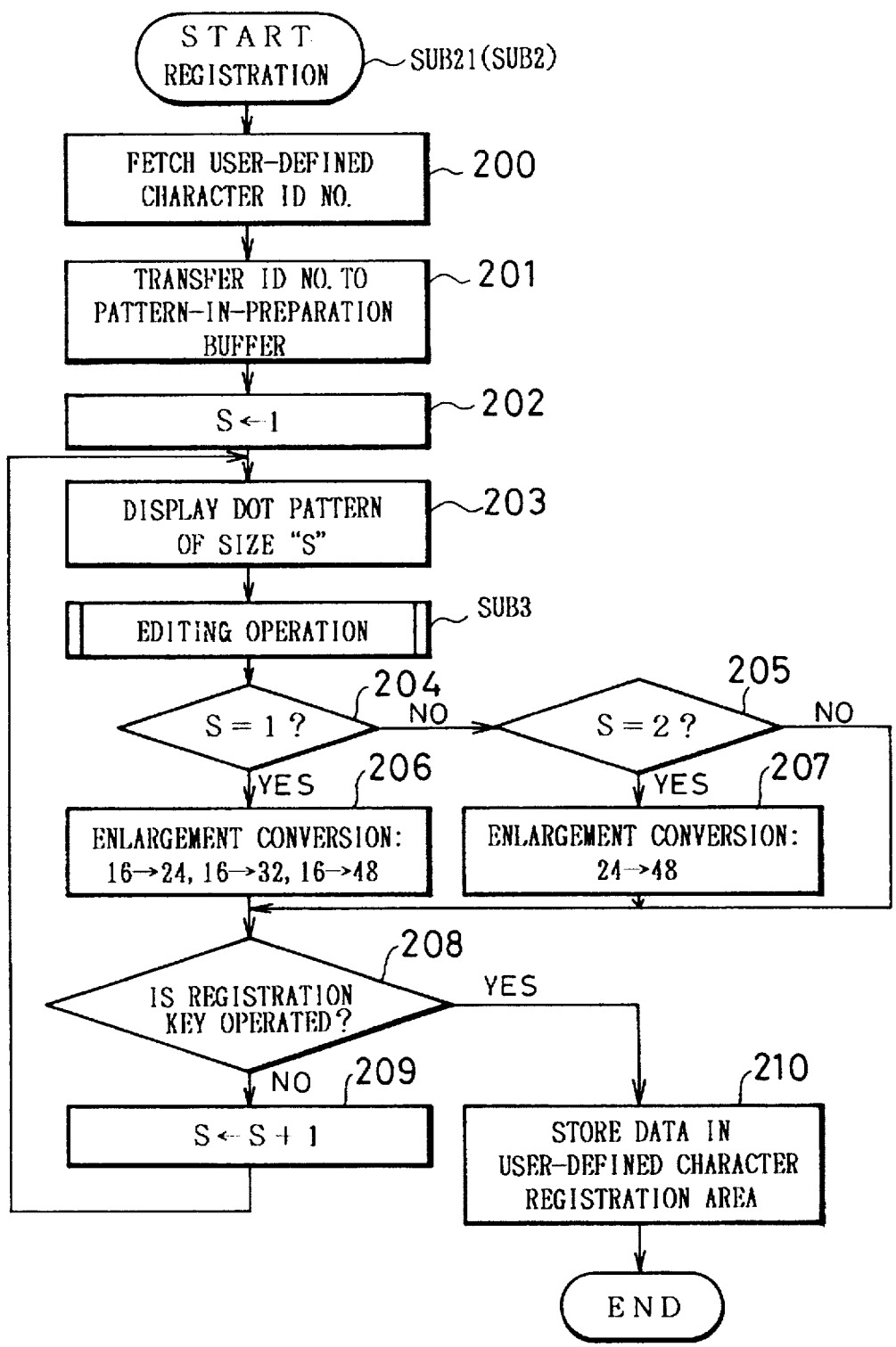
FIG. 1 is a flowchart for illustrating an operation of registering a user-defined character in an embodiment of the present invention.
Figure 6:
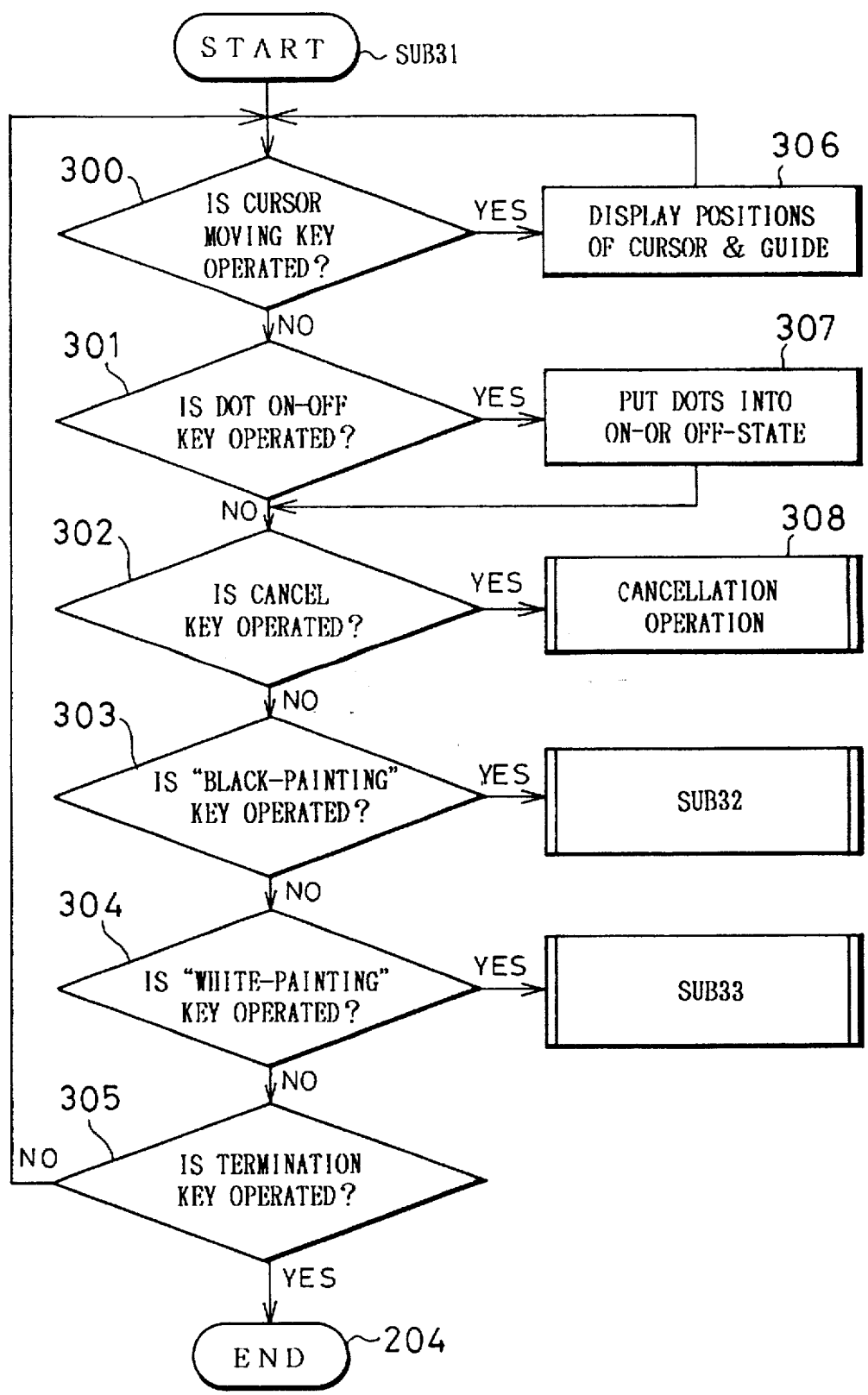
FIG. 6 is a flowchart for illustrating a process to be performed in a "normal" editing mode in the embodiment of the present invention.
Figure 7:
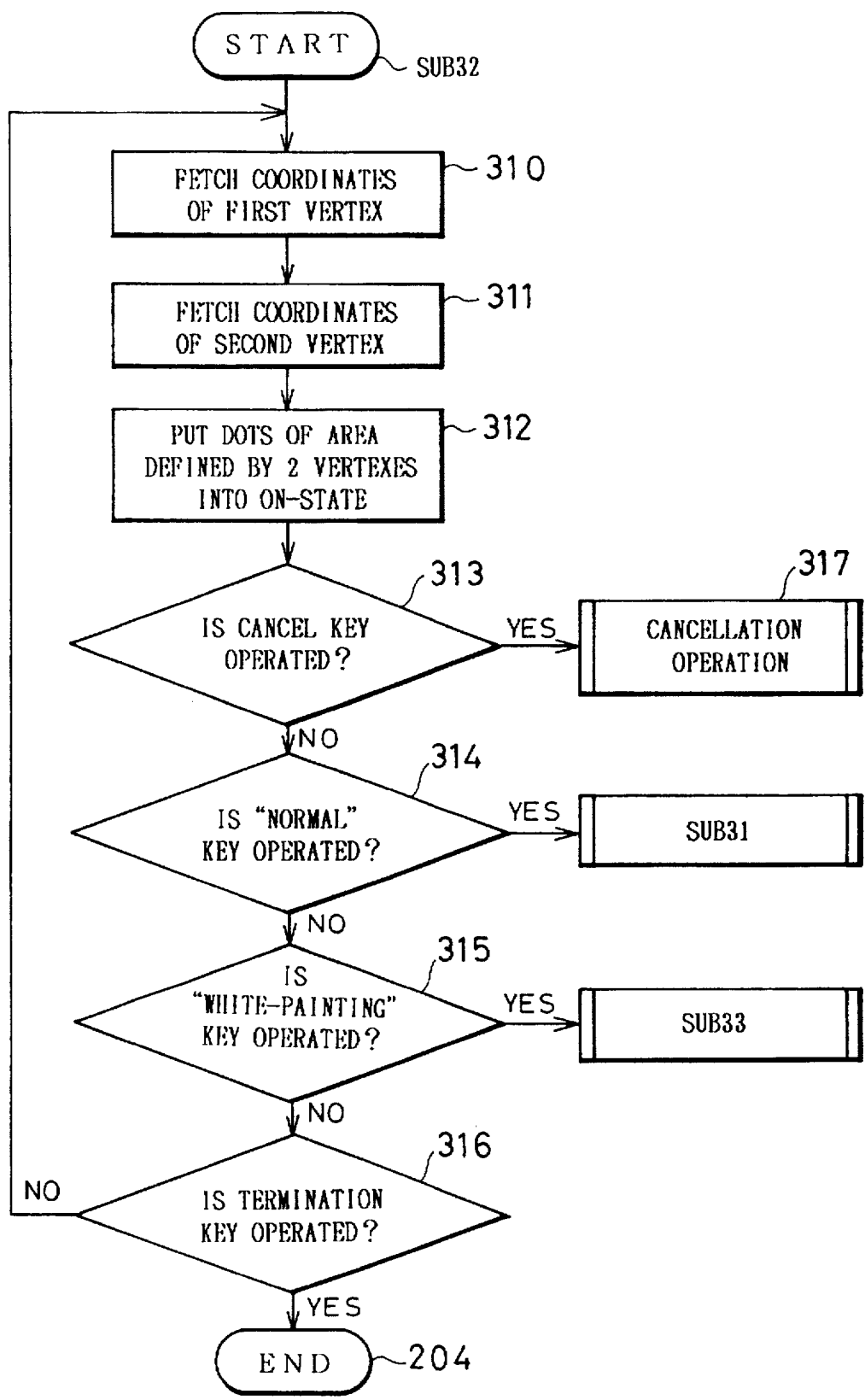
FIG. 7 is a flowchart for illustrating a process to be performed in a "black-painting" editing mode in the embodiment of the present invention.

Moreover, various processing programs and inalterable data (or constant data) like kana-kanji translation dictionary data are stored in the ROM 22. Furthermore, a program 22a for user-defined characters, which will be described later by referring to FIGS. 1, 6 and 7, is stored in the ROM 22.

On the other hand, the RAM 23 is used as a work memory and is also operative to store inalterable data, which is input by a user, therein.

In relation to a user-defined character mode, the RAM 23 has: a user-defined character registering area 23a in which a dot pattern representing the generated user-defined character is stored; a pattern-in-preparation buffer 23b for storing a dot pattern representing a user-defined character, which is currently being generated, therein; a display buffer 23c for displaying image data to be displayed on the screen of the LCD unit 35 during performing an operation of registering a user-defined character; and an enlargement conversion buffer 23d used for performing an enlargement conversion on a dot pattern. The user-defined character registering area 23a and the pattern-in-preparation buffer 23b are adapted to be capable of storing dot patterns of four sizes.

In the case of this embodiment, a RAM pack (not shown), which has the same function as of the RAM 23, can be added thereto.

Furthermore, the CG-ROM 24 stores dot patterns of four sizes, which represent characters and symbols supported by this tape printing device, respectively. Moreover, the CG-ROM 24 is adapted to output a dot pattern representing a character or a symbol when code data specifying a character or a symbol is given. A CG-ROM for displaying a character or symbol may be provided therein separately from another CG-ROM for printing the character or symbol. Here, it is assumed that font information stored in the CG-ROM 24 designates bitmap fonts. Namely, each of these fonts is such that dot patterns of various sizes need to be provided correspondingly thereto. The registration of a user-defined character can be performed on a character, the corresponding dot patterns of which are not provided in the CG-ROM 24.

The input interface portion 25 is operative to provide the interface between the input portion 10 and the control portion 20. Further, the output interface portion 26 is operative to provide the interface between the output portion 30 and the control portion 20.

Moreover, the CPU 21 processes an input signal sent from the input portion 10 and executes a processing program, which is stored in the ROM 22 and corresponds to a current stage of the processing, by utilizing the work area established in the RAM 23 and by suitably using the inalterable data stored in the ROM 22 and in the RAM 23, if necessary. Furthermore, the CPU 21 causes the LCD 35 to display information representing the situation or results of the processing on the screen thereof and also causes the thermal head to print such information on tape (not shown).

(B) Various Operations Concerning User-defined Characters

Next, various operations concerning user-defined characters will be described in detail hereinbelow by referring to the drawings.

In the case of this embodiment, the operations concerning user-defined characters are "registration", "modification", "calling", "copying" and "deletion" operations. The device enters a loop consisting of these operations concerning user-defined characters from a symbol selection operation of FIGS. 4(A) and 4(B). Namely, in the tape printing device of this embodiment, user-defined characters are provided as a kind of symbols which include editing symbols, symbols used in mathematical expressions and symbols for designating animate beings.

When a symbol key is operated, the CPU 21 starts executing a processing program of FIG. 4(A). First, in step 100, the kind of a preferential symbol (for example, the kind of a symbol on which an operation of selecting a symbol is recently performed) is displayed on the LCD unit 35. Thereafter, the operated key is discriminated from the other keys in step 101. If a kind candidate changing key (for example, a cursor moving key) is operated, the CPU 21 changes a candidate for a kind of a symbol and causes the LCD unit 35 to display the new candidate on the screen thereof in step 102. Then, the program returns to step 101. If it is judged as the result of the discrimination performed in step 101 that a selection key is operated, the CPU 21 causes the program to advance to one of subroutines SUB1 corresponding to the currently displayed kind of a symbol. Hereat, if the selection key is operated under circumstances where a kind of an operation concerning a user-defined character is displayed, the CPU 21 causes the program to advance to one (SUB11) of the subroutines SUB1.

When the CPU 21 enters this subroutine SUB11 (namely, when passing control to this subroutine SUB11), an indication, which represents a preferential operation concerning a user-defined character (for example, a recently performed operation concerning the user-defined character), is displayed on the screen of the LCD unit 35. Then, the operated key is discriminated from the other keys in step 111. If a candidate-for-operation-concerning-user-defined-character changing key (for example, a cursor moving key) is operated, the CPU 21 changes a candidate for an operation concerning a user-defined character into the next one of operations concerning a user-defined character, which follow in the sequence of FIG. 4(C), and causes the LCD unit 35 to display the new candidate on the screen thereof in step 112. Subsequently, the program returns to step 111. If it is judged as the result of the discrimination performed in step 111 that a selection key is operated, the CPU 21 causes the program to advance to one (SUB21) of a group SUB2 of subroutines corresponding to the currently displayed operation concerning a user-defined character.

Next, an operation, which should be performed in the case where the program advances to the subroutine SUB21 for the "registration" of a user-defined character through the aforementioned process, will be described in detail by referring to FIG. 1.

When the CPU 21 enters the subroutine SUB21 for the "registration", the CPU 21 fetches data representing an area management number of a user-defined character registration area 23a (namely, a user-defined character identification number) in step 200. In the case of the tape printing device, the memory capacity of the RAM is small, so that the RAM can store only several user-defined characters therein. Further, the user-defined character registration area is divided or partitioned into sub-areas of the number equal to the maximum number of user-defined characters that can be registered therein. Moreover, an area management number is assigned to each of the sub-areas. Namely, the area management number assigned to each sub-area is a user-defined character identification number. Each of the sub-areas respectively assigned to user-defined characters is divided or partitioned into sub-regions respectively corresponding to the sizes of dot patterns.

For example, after an initial value of the user-defined character identification number is displayed, a key discrimination is performed. Further, the candidate is changed if a next candidate key (namely, a cursor moving key) is operated. A user-defined character identification number displayed at the time of operating the selection key is fetched as being designated. When a RAM package is connected thereto, user-defined character identification numbers assigned to the RAM package can be selected by a user.

When a user-defined character identification number is input to the device, the CPU 21 reads data representing dot patterns of all of the sizes, which are stored in the sub-area, which corresponds to the selected user-defined character identification number, of the user-defined character registration area 23a. Further, the CPU 21 writes the read data representing dot patterns of all of the sizes to corresponding regions of the pattern-in-preparation buffer 23b, respectively. In the case where no data corresponding to a user-defined character has been registered in such a region of the buffer 23b, a dot pattern, all of the dots of which represent background dots (namely, what are called "off-dots"), is stored in such a region. Next, the CPU 21 sets a size parameter "s" to an initial value of 1. Initially, in the case where the size parameter "s" is 1, this size parameter designates a 16×16 dot pattern. Further, in the case where the size parameter "s" is 2, this size parameter designates a 24×24 dot pattern. Moreover, in the case where the size parameter "s" is 3, this size parameter designates a 32×32 dot pattern. Furthermore, in the case where the size parameter "s" is 4, this size parameter designates a 48×48 dot pattern.

Subsequently, the CPU 21 loads the dot pattern of the size designated by the size parameter "s", which has been written to the pattern-in-preparation buffer 23b, into the display buffer 23c as the dot pattern for generating a user-defined character. Moreover, the CPU 21 further loads editing mode information into the display buffer 23c. Furthermore, the CPU 21 causes the LCD unit 35 to display such data and information on the screen thereof.

Figure 5:
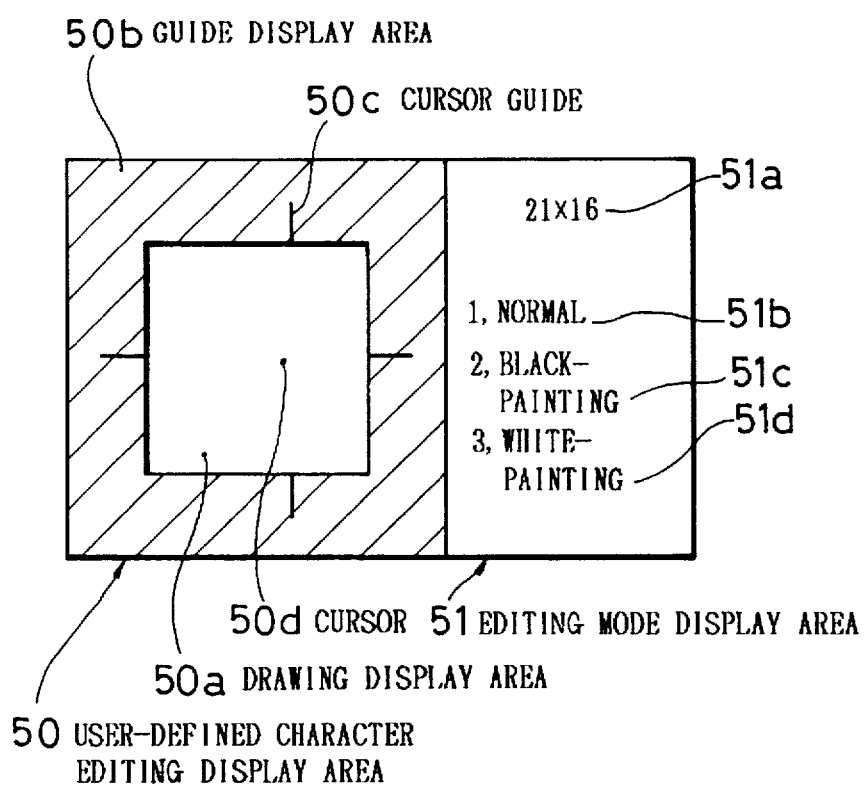
FIG. 5 is a diagram for illustrating an example of a display screen of the liquid crystal display unit when performing a user-defined character registering operation and a modification operation.

FIG. 5 illustrates an example of a display screen for the generation of a user-defined character by performing an operation in step 203. This display screen for the generation of a user-defined character comprises a user-defined character editing display area 50 and an editing mode display area 51.

Further, the user-defined character editing display area 50 is composed of a drawing display area 50a, on which character composing portions of the dot pattern representing a user-defined character is displayed by "on-dots" and the background is displayed by "off-dots", and a guide display area 50b on which a cursor guide 50c for guiding the position of a cursor 50d is displayed and portions other than the cursor guide 50c is displayed by "on-dots". The LCD unit 35 of this embodiment has a screen of the size which is 4 lines of 6 characters (namely, 64×96 dots) or so as illustrated in FIG. 3. Thus a dot pattern of the maximum size (namely, 48×48 dots) can be displayed on this screen at a time, just as it is. Therefore, the size of a dot pattern to be registered at that time is assigned to the drawing display area 50a. Therefore, the remaining portion of the user-defined character edition display area 50 is assigned to the guide display area 50b. Namely, the drawing display area 50a varies with the size of the dot pattern.

Here, it is assumed that an object dot to be operated is displayed by being put into a blinking state. Generally, in the technical field of functions concerning a user-defined character, such a blinking dot is called a cursor 50d. There are four cursor guides 50c which extend from four boundary lines between the drawing display area 50a and the guide display area 50b into the area 50b in such a manner that the four cursor guides are perpendicular to the boundary lines, respectively, and that the position of the point of intersection of a line, which connects two cursor guides extending in a vertical direction (namely, Y-direction), and another line, which connects two cursor guides extending in a lateral direction (namely, X-direction), should be coincident with the position of the cursor 50d. Therefore, when the position of the cursor 50d is changed, the position of the cursor guide 50c varies in response to the change in position of the cursor 50d.

As the result of providing such a cursor guide 50c in the display screen, a user is able to easily achieve the visual recognition of the position of an object dot, namely, a dot at which the cursor 50d is placed, in the entire dot pattern from a graphic display thereof.

Further, coordinate information 51a indicating the position of the cursor 50d and the names or indications 51b, 51c and 51d of three kinds of editing modes, namely, "normal", "black-painting" and "white-painting" are displayed on the editing mode display area 51. Moreover, the name of a selected editing mode is reversed. Furthermore, a numeric character corresponding to a numeric key to be operated for selecting a corresponding one of the editing modes is also displayed just prior to (namely just on the left side of) the name of the corresponding editing mode as illustrated in this figure.

Here, if a dot pattern is displayed in step 203, the cursor 50d is located at a place which have both of the largest X- and Y-coordinates (namely, is located at an upper right vertex of the guide display area 50b). Further, at that time, the coordinate information 51a designating the position of the cursor 50d comes to represent the size (for instance, 16×16) of a dot pattern to be edited (namely, to be registered or corrected). Thereby, a user can correctly recognize the size of the dot pattern to be edited.

The "normal" editing mode is an editing mode in which an on-off control operation is performed on each of the dots of a dot pattern to be edited. Further, the "black-painting" editing mode is an editing mode in which all of the dots of a dot pattern to be edited are changed into "on-dots". Moreover, the "white-painting" editing mode is an editing mode in which all of the dots of a dot pattern to be edited are changed into "off-dots". Furthermore, the device is adapted to select the "normal" editing mode when the screen is in an initial display state in which a dot pattern is displayed in step 203. In the case where a user generates a dot pattern representing a picture or the like, the user can easily generate the dot pattern by utilizing the "black-painting" editing mode or the "white-painting" editing mode. For such a reason, the "black-painting" editing mode and the "white-painting" editing mode are provided in the device.

Subsequently, the CPU 21 executes a group of subroutines SUB3 (to be described later by referring to FIGS. 6 to 8) for editing the dot pattern selected in response to the user's operation. Thus the CPU 21 completes the fetch of data representing the dot pattern of the size, which is an object dot-pattern to currently be edited.

Thereafter, the CPU 21 identifies the value of the size parameter "s" in steps 204 and 205.

When the size parameter "s" has a value of 1 (namely, the size of 16×16 dots is designated), the CPU 21 serially generates a 24×24 dot pattern, a 32×32 dot pattern and a 48×48 dot pattern in step 206 by performing an enlargement conversion operation on the generated 16×16 dot pattern.

Moreover, the CPU 21 writes data representing each of the generated dot patterns to one of the regions, which respectively correspond to the sizes of the dot patterns, of the pattern-in-preparation buffer 23b. An example of the enlargement conversion operation (to be described later) is illustrated in FIG. 7.

Further, when the size parameter "s" has a value of 2 (namely, the size of 24×24 dots is designated), the CPU 21 generates a 48×48 dot pattern in step 207 by performing an enlargement conversion operation on the generated 24×24 dot pattern. Moreover, the CPU 21 writes data representing each of these dot patterns to one of the regions, which respectively correspond to the sizes of these dot patterns, of the pattern-in-preparation buffer 23b.

When the size parameter "s" has a value of 3 or 4, the enlargement conversion operation is not performed on a dot pattern.

Thereafter, the CPU 21 judges in step 208 whether or not a registration key is operated. If not operated, the size parameter "s" is incremented by 1. Then, the program returns to step 203. In contrast, if operated, the CPU 21 causes the LCD unit 35 in step 210 to display a message indicating that a registration operation is being performed. Moreover, in this step, the CPU 21 transfers the dot patterns of all of the sizes representing a user-defined character, which are stored in the pattern-in-preparation buffer 23b, to the sub-area, which corresponds to the selected user-defined character identification number, of the user-defined character registration area 23a. Upon completion of the transfer, the CPU 21 returns the device into a state of the device immediately before the user-defined character mode is indicated. Then, the CPU 21 finishes performing the sequence of operations for the registration.

In the case where a dot pattern of another size is displayed when the program returns to step 203, the CPU 21 changes the size of the drawing display area 50a according to the size parameter "s" into a size designated by this parameter.

In the case of a general or typical process (or flow of work), a 16×16 dot pattern is first generated by performing such operations. Thereafter, a 24×24 dot pattern, a 32×32 dot pattern and a 48×48 dot pattern are automatically generated in sequence by performing the enlargement conversion operations. Subsequently, the automatically generated 24×24 dot pattern is modified by the user and a new 24×24 dot pattern is thus generated. Then, a new 48×48 dot pattern is automatically generated by performing an enlargement conversion operation on this corrected 24×24 dot pattern. Thereafter, the automatically generated 32×32 dot pattern is modified by the user and a new 32×32 dot pattern is thus generated. Furthermore, the automatically generated 48×48 dot pattern is modified by the user and a new 48×48 dot pattern is thus generated. Then, the dot patterns of the four sizes are registered in the user-defined character registration area 23a by operating the registration key. If the registration key is operated in the middle of the process, the registration operation is performed at that point of time.

Here, in the case of this embodiment, a 48×48 dot pattern is automatically generated when a 24×24 dot pattern is completed. The reason is to reduce the extent of a modification to be made for completing a 48×48 dot pattern by reflecting information, which concerns a modification made by the user to complete a 24×24 dot pattern, in the automatically generated 48×48 dot pattern. Thus, it may be considered that the automatic generation of a 48×48 dot pattern is unnecessary when a 16×16 dot pattern is completed. However, in such a case, if the registration key is operated just after a 16×16 dot pattern is completed, no 48×48 dot pattern is generated. Namely, a dot pattern of one size is not completed yet. Therefore, the registration of a user-defined character can not be performed.

Figure 8:
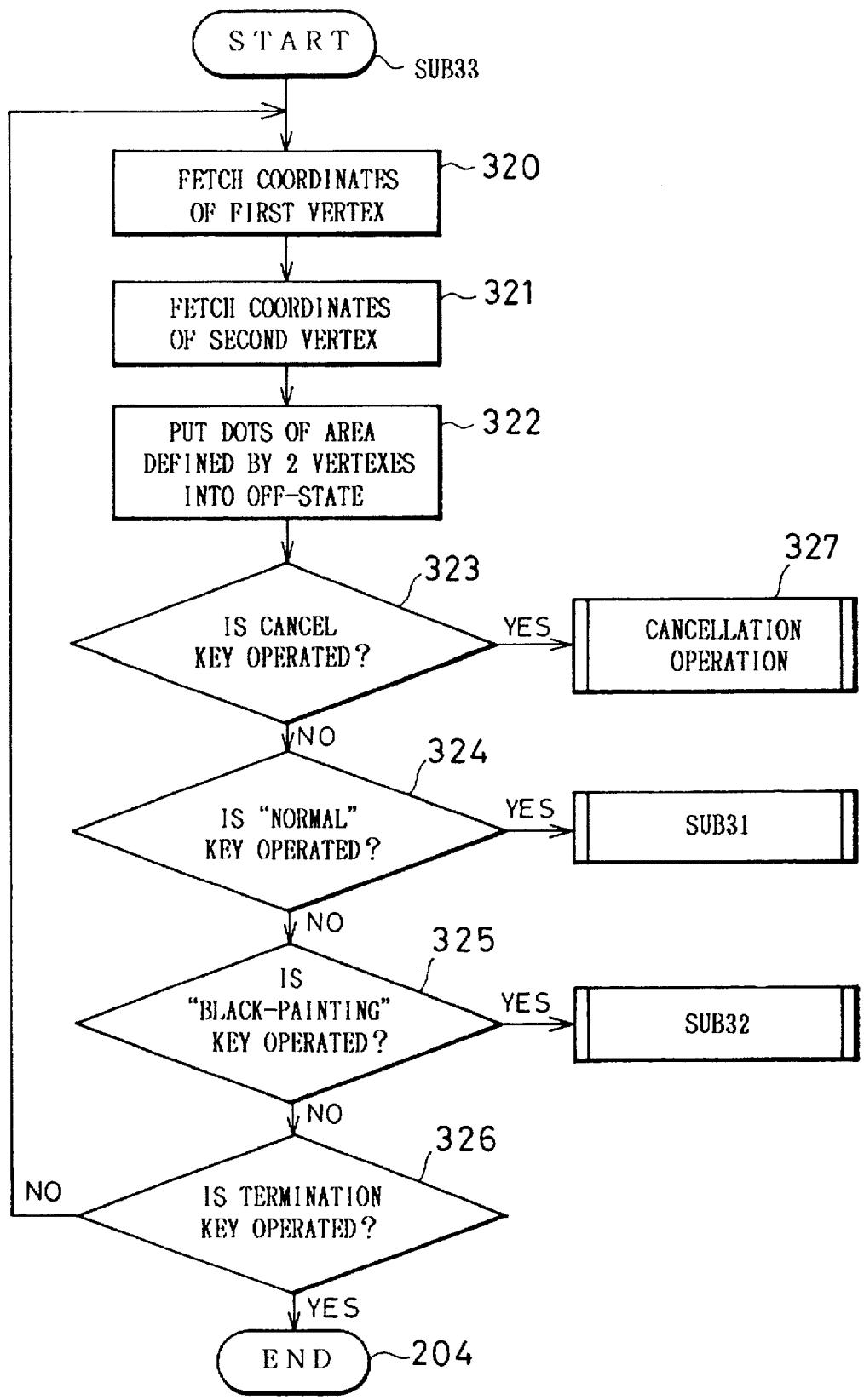
FIG. 8 is a flowchart for illustrating a process to be performed in a "white-painting" editing mode in the embodiment of the present invention.

Next, the group SUB3 of subroutines for editing a dot pattern in response to the user's operation will be described hereinbelow by referring to FIGS. 6 to 8.

Here, an editing operation subroutine SUB31 is provided for the "normal" editing mode. Further, another editing operation subroutine SUB32 is provided for the "black-painting" editing mode. Moreover, still another editing operation subroutine SUB33 is provided for the "white-painting" editing mode.

When the CPU 21 enters the editing operation subroutine SUB31 for the "normal" editing mode, the CPU 21 judges in steps 300 to 305 what key operation is performed on the keying portion by the user. Such judgements are performed repeatedly. Namely, judgements on whether or not a cursor moving key is operated, whether a dot-on key or a dot-off key is operated, whether or not a cancel key is operated, whether or not a key for designating the "black-painting" editing mode (namely, a key for the digit "2") is operated, whether or not a key for designating the "white-painting" editing mode (namely, a key for the digit "3") is operated, and whether or not a termination key for indicating the termination of the generation of an object dot pattern of a size to be generated is operated, are repeatedly performed in this order.

In the case where the cursor moving key is operated, the CPU 21 changes places, at which the cursor 50d and the cursor guide 50c are respectively displayed, on the screen of the LCD unit 35 in response to the operation performed on the cursor moving key in step 306. Moreover, the contents of the cursor coordinate information 51a to be displayed are also changed at that time. Subsequently, the program returns to step 300 whereupon it is judged whether or not the cursor moving key is operated. Thereby, the automatic repetition of the aforementioned judgements can be achieved.

When a dot-on key or dot-off key is operated, in step 307 the CPU 21 causes the LCD unit 35 to display a dot, at which a cursor 41 is placed at that point of time, as an "on-dot" (namely, a portion composing a character or the like) or an "off-dot" (namely, a portion of the background). Moreover, the logical level of a corresponding dot stored in the pattern-in-preparation buffer 23b is changed into the logical level of an "on-dot" (namely, a portion composing a character or the like) or of an "off-dot" (namely, a portion of the background). Then, the program advances to step 302 hereupon it is judged whether or not a mode cancel key is operated.

In the case where the cancel key is operated, in step 308, the CPU 21 returns to a former state in which the CPU 21 is put before being instructed to perform the "registration", that is, goes back to a state in which one of the operations concerning a user-defined character, namely, one of "registration", "modification", "calling", "copying" and "deletion" operations is selected.

When the key for designating the "black-painting" editing mode is operated, the CPU 21 causes the currently executed program to pass control to the subroutine SUB32. Further, when the key for designating the "white-painting" editing mode is operated, the CPU 21 causes the currently executed program to pass control to the subroutine SUB33.

If the termination key for indicating the termination of the generation of an object dot pattern of a size to be generated is operated, the CPU 21 causes the program to advance to the aforesaid step 204.

When the CPU 21 enters the subroutine SUB32 corresponding to the "black-painting" editing mode, the CPU 21 fetches the coordinates of two diagonally opposite vertexes of (or for defining) a region to be filled in with black in steps 310 and 311 (the user may point out these vertexes by, for example, placing the cursor thereat and further operating the selection key). Then, the CPU 21 causes the LCD unit 35 to display all of dots within a rectangular region defined by such two vertexes by using "on-dots" (as a portion composing a character or the like) in step 312. Moreover, the logical level of each of corresponding dots stored in the pattern-in-preparation buffer 23b is changed into the logical level of an "on-dot" (namely, a portion composing a character or the like).

Next, the CPU 21 judges in steps 313 to 316 whether or not a cancel key is operated, whether or not a key for designating the "normal" editing mode (namely, a key for the digit "1") is operated, whether or not a key for designating the "white-painting" editing mode (namely, a key for the digit "3") is operated, and whether or not a termination key for indicating the termination of the generation of an object dot pattern of a size to be generated is operated, in this order.

In the case where the cancel key is operated, in step 317, the CPU 21 returns to the former state in which the CPU 21 is put before being instructed to perform the "registration", that is, goes back to a state in which one of the operations concerning a user-defined character, namely, one of "registration", "modification", "calling", "copying" and "deletion" operations is selected.

When the key for designating the "normal" editing mode is operated, the CPU 21 causes the currently executed program to pass control to the editing operation subroutine SUB31. Further, when the key for designating the "white-painting" editing mode is operated, the CPU 21 causes the currently executed program to pass control to the subroutine SUB33.

If the termination key for indicating the termination of the generation of an object dot pattern of a size to be generated is operated, the CPU 21 causes the program to advance to the aforesaid step 204. If not operated, the CPU 21 causes the program to return to the aforesaid step 310. Incidentally, when the processing is performed in the aforementioned steps 310 to 312, it is monitored whether the cursor moving key or the selection key are operated. If such keys are not operated, the CPU 21 is adapted to cause the program to advance to step 313.

When the CPU 21 enters the subroutine SUB33 corresponding to the "white-painting" editing mode, the CPU 21 fetches the coordinates of two diagonally opposite vertexes of (or for defining) a region to be filled in with white in steps 320 and 321 (incidentally, the user may point out these vertexes by, for example, placing the cursor thereat and further operating the selection key). Then, the CPU 21 causes the LCD unit 35 to display all of dots within a rectangular region defined by such two vertexes by using "off-dots" (as a portion composing the background) in step 322. Moreover, the logical level of each of corresponding dots stored in the pattern-in-preparation buffer 23b is changed into the logical level of an "off-dot" (namely, a portion composing the background).

Next, the CPU 21 judges in steps 323 to 326 whether or not a cancel key is operated, whether or not a key for designating the "normal" editing mode (namely, a key for the digit "1") is operated, whether or not a key for designating the "black-painting" editing mode (namely, a key for the digit "2") is operated, and whether or not a termination key for indicating the termination of the generation of an object dot pattern of a size to be generated is operated, in this order.

In the case where the cancel key is operated, in step 327, the CPU 21 returns to the former state in which the CPU 21 is put before being instructed to perform the "registration", that is, goes back to a state in which one of the operations concerning a user-defined character, namely, one of "registration", "modification", "calling", "copying" and "deletion" operations is selected.

When the key for designating the "normal" editing mode is operated, the CPU 21 causes the currently executed program to pass control to the subroutine SUB31. Further, when the key for designating the "black-painting" editing mode is operated, the CPU 21 causes the currently executed program to pass control to the subroutine SUB32.

If the termination key for indicating the termination of the generation of an object dot pattern of a size to be generated is operated, the CPU 21 causes the program to advance to the aforesaid step 204. If not operated, the CPU 21 causes the program to return to the aforesaid step 320. When the processing is performed in the aforementioned steps 320 to 322, it is monitored whether the cursor moving key or the selection key are operated. If such keys are not operated, the CPU 21 is adapted to cause the program to advance to step 323.

Figure 9:
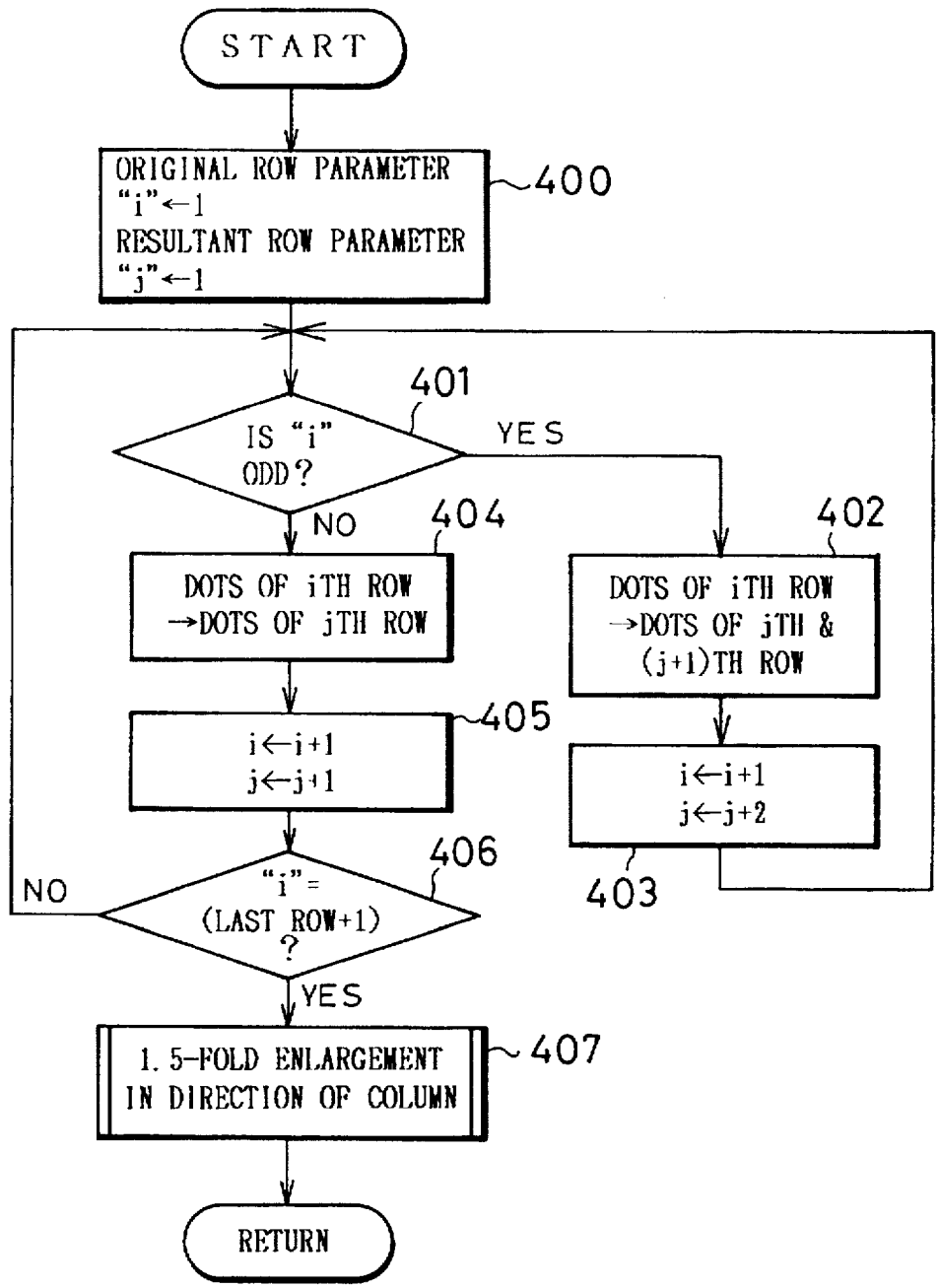
FIG. 9 is a flowchart for illustrating an enlargement conversion operation to be performed on a dot pattern in the embodiment of the present invention.

Next, an example of the enlargement conversion operation (hereunder referred to as the generated-dot-pattern enlargement conversion operation) to be performed on a dot-pattern, which has been already generated, will be described in detail by referring to FIG. 9. As is understood from the foregoing description, there are three kinds of the generated-dot-pattern enlargement conversion operations which employ 1.5-times, 2 times and 3 times as an enlargement ratio (namely, a magnification), respectively, and are almost similar to one another. Therefore, the generated-dot-pattern enlargement conversion operation employing 1.5-times as the enlargement ratio will be described in detail hereinbelow.

In the case of this embodiment, a 1.5-fold enlargement of a dot pattern is performed by first enlarging the dot pattern in the direction of a row thereof to 1.5 times the size in such a direction thereof and next enlarging the dot pattern in the direction of a column thereof to 1.5 times the size in this direction thereof. An enlargement operation in the direction of a row of a dot pattern is similar to that in the direction of a column thereof expect for the direction in which the enlargement is performed. Thus an enlargement operation in the direction of a row of a dot pattern will be described hereinbelow in particular.

First, in step 400, the CPU 21 sets both of a row parameter (hereunder referred to as an original row parameter) "i", which corresponds to an original dot pattern to be converted or enlarged, and a second parameter (hereunder referred to as a resultant row parameter) "j", which corresponds to a resultant dot pattern obtained by performing the enlargement conversion, to initial values of 1, respectively. Then, it is judged in step 401 whether the original row parameter "i" is odd or even.

In the case where the original row parameter "i" is odd, the CPU 21 fetches or reads data representing dots of an ith row of a currently generated dot pattern of a size (namely, an original dot pattern), which are stored in the pattern-in-preparation buffer 23b, therefrom and next causes the enlargement conversion buffer 23d to store the data representing dots of the ith row therein as dots of jth and (j+1)th rows of a resultant dot pattern in steps 402 and 403. Thereafter, the original row parameter "i" is incremented by 1. Further, the resultant row parameter "j" is incremented by 2. Then, the program returns to step 401 whereupon it is judged whether the original row parameter "i" is odd or even.

In contrast, in the case where the original row parameter "i" is even, the CPU 21 fetches or reads data representing dots of an ith row of a currently generated dot pattern (namely, an original dot pattern), which are stored in the pattern-in-preparation buffer 23b, therefrom and next causes the enlargement conversion buffer 23d to store the data representing dots of the ith row therein as dots of a jth row of a resultant dot pattern in steps 404 and 405. Thereafter, each of the original row parameter "i" and the resultant row parameter "j" is incremented by 1.

Subsequently, the CPU 21 judges in step 406 whether or not an operation to be performed on the last row of the original dot pattern is finished, namely, whether or not the enlargement in the direction of the row of the original dot pattern is finished. If not, the program returns to step 401 whereupon it is judged whether the original row parameter "i" is odd or even. In contrast, if finished, the CPU 21 causes the program to advance to step 407 whereupon the enlargement in the direction of a column of the original dot pattern is performed. Further, when the enlargement in the direction of a column of the original dot pattern is finished, the series of the enlargement conversion operations is finished.

Here, the enlargement in the direction of a column of an original dot pattern is similar to that in the direction of a row thereof. Therefore, the detail description of the enlargement in the direction of a column thereof is omitted. Data representing a dot pattern of a size already enlarged in the direction of a row thereof, which is stored in the enlargement conversion buffer 23d, is used as data representing the original dot pattern, on which the enlargement in the direction of a column thereof should be performed. Further, data representing a resultant dot pattern obtained by the enlargement in the direction of a column of the original dot pattern of the current size is stored in a region, which corresponds to the next size of the dot pattern, of the pattern-in-preparation buffer 23b.

Figure 10:
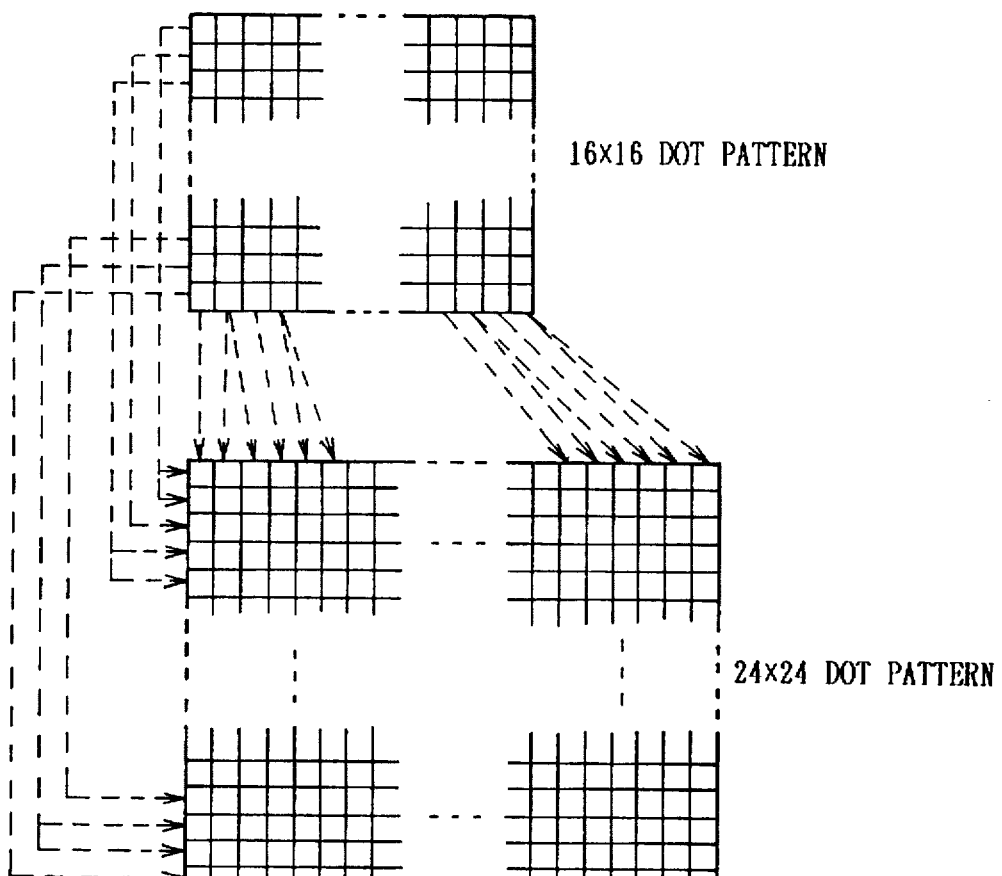
FIG. 10 is a diagram for illustrating an exemplary case of the enlargement conversion operation to be performed on a dot pattern in the embodiment of the present invention.

FIG. 10 illustrates such a 1.5-fold enlargement conversion diagrammatically. Further, FIG. 11(A) illustrates such a 2-fold enlargement conversion (namely, an enlargement conversion from a 16×16 dot pattern to a 32×32 dot pattern) diagrammatically. As shown in this figure, information concerning each dot of an original dot pattern is repeatedly utilized two times for each of the enlargement in the direction of a row thereof and that in the direction of a column thereof. Moreover, FIG. 11(B) illustrates such a 3-fold enlargement conversion (namely, an enlargement conversion from a 16×16 dot pattern to a 48×48 dot pattern) diagrammatically. As shown in this figure, information concerning each dot of an original dot pattern is repeatedly utilized three times for each of the enlargement in the direction of a row thereof and that in the direction of a column thereof.

Hereinafter, the remaining operations concerning a user-defined character, namely, "modification", "calling", "copying" and "deletion" operations will be described briefly, though flowcharts for illustrating these operations are omitted.

The "modification" operation is almost similar to the "registration" operation except that even when the modification of a 16×16 dot pattern or a 24×24 dot pattern is completed, an enlargement of such a dot pattern to a dot pattern of another larger size is not performed. Namely, the "modification" operation is different from the "registration" operation in that the "modification" operation does not have the process to be performed in steps 204 to 207 of FIG. 1. Thereby, the modification of a dot pattern of a size does not affect the dot pattern of another size. Consequently, the dot patterns of different sizes can be modified separately.

In the "calling" operation, one of user-defined character identification numbers is first selected. Further, a code representing the selected user-defined character identification number is added to data stored in a text area of the RAM 23. Then, a 16×16 dot pattern corresponding to the user-defined character is fetched or read therefrom and is given to the display buffer 23c. Thus, the user-defined character is displayed on a character input screen. In the case of the conventional device, a symbol designating a user-defined character identification number is displayed. This embodiment of the present invention is, however, different from the conventional device in that a generated user-defined character is displayed instead of such a symbol.

In the "copying" operation, an area management number (a user-defined character identification number) of the user-defined character registration area 23a (hereunder referred to as the source area management number) of a device, from which dot patterns representing a user-defined character are copied, and an area management number (a user-defined character identification number) of the user-defined character registration area 23a (hereunder referred to as a destination area management number) of another device, onto which the dot patterns representing a user-defined character are copied, are first fetched or read. Then, dot patterns of all sizes stored in the user-defined character registration area 23a specified by the source area management number are copied onto the user-defined character registration area 23a specified by the destination area management number. Upon completion of the copying, the character input screen is restored.

In the "deletion" operation, an area management number (a user-defined character identification number) of the user-defined character registration area 23a corresponding to a user-defined character to be deleted is first fetched or read. Then, dot patterns of all sizes stored in the user-defined character registration area 23a specified by this area management number (namely, this user-defined character identification number) are deleted (namely, for example, all of these dots are changed into "off-dots"). Upon completion of the deletion, the character input screen is restored.

(C) Effects of Embodiment

In the case of the aforementioned embodiment of the present invention, when performing the "registration" of a user-defined character, a 48×48 (tentative) dot pattern is automatically generated even if the generation of a 24×24 dot pattern is completed. Thus, a user has only to correct or modify the 48×48 (tentative) dot pattern which has been once generated from the 24×24 dot pattern by taking into account information concerning a correction or modification made thereon. Thereby, a user can easily generate a 48×48 (final) dot pattern. Consequently, the device, whose operability is further improved, can be realized.

Further, in the case of the aforementioned embodiment, in addition to the "normal" editing mode for performing an on-off control operation on each of the dots of a dot pattern to be edited, the "black-painting" editing mode for changing all of the dots within a specified region into "on-dots" and the "white-painting" editing mode for changing all of the dots within a specified region into "off-dots" are provided as the editing modes at the time of performing the "registration" and the "modification" of a user-defined character. Thus, a user comes to be able to easily perform operations of registering and modifying a picture and a symbol, which contain a large portion of filled-in areas. Thereby, the device, whose operability is further improved, can be realized.

Moreover, in the case of the aforementioned embodiment, the user-defined character editing display area 50 is composed of the drawing display area 50a, the size of which changes according to the size of a dot pattern representing a user-defined character, for displaying the dot pattern representing the user-defined character, and the guide display area 50b provided on the outside of the drawing display area 50a. Furthermore, the cursor guide 50c for guiding the position of the cursor 50d is displayed on the guide display area 50b. Thereby, a user can achieve the visual recognition of the position of the cursor easily and accurately in the entire dot pattern, without paying attention only to the vicinity of the cursor. As a result, the device comes to be easily operated. Consequently, the device, whose operability is further improved, can be realized.

Furthermore, the size of the drawing display area 50a is changed according to the size of a dot pattern to be generated. This facilitates to the recognition of the dot pattern according to the size thereof.

(D) Other Embodiments

In the case of the aforementioned embodiment (hereunder sometimes referred to as the first embodiment) of the present invention, when performing the registration of a user-defined character, corresponding dot patterns of different sizes are generated in the increasing order of the size. The present invention is not limited thereto. In brief, it is essential only that a larger dot pattern can be generated by modifying a dot pattern for generating the larger dot pattern, which has been obtained by enlarging another already generated dot pattern. For example, when generating four kinds of dot patterns, whose sizes are 16×16 dots, 24×24 dots, 32×32 dots and 48×48 dots, in another embodiment of the present invention, the dot pattern of the size of 16×16 dots, that of the size of 24×24 dots, that of the size of 32×32 dots and that of the size of 48×48 dots may be generated in this order.

Further, in the case of the device of the present invention, the size of the already generated dot pattern to be used for generating a dot pattern of a new size is not limited to that of the case of the first embodiment. For instance, in the case of a further embodiment of the present invention, a (tentative) 48×48 dot pattern may be automatically generated from the (already generated) 32×32 dot pattern.

Moreover, in the case of the first embodiment, the dot patterns of four sizes are generated correspondingly to each user-defined character. In the case of the device, namely, still another embodiment of the present invention, the number of kinds of sizes of dot patterns to be generated is not limited to four.

Furthermore, in the case of the first embodiment, only the dot pattern of the smallest one of the four sizes is generated from scratch. However, in the case of yet another embodiment of the present invention, the dot patterns of two or more sizes are generated from scratch. Then, the dot patterns of the remaining sizes are generated by enlarging the already generated dot patterns and next displaying the enlarged dot patterns and subsequently modifying the displayed dot patterns.

Additionally, in the case of the first embodiment, the "regions filled in with black" and the "regions filled in with white" are rectangular regions. However, in the cases of another embodiment of the present invention, regions of another shape such as a triangle may be employed as the "regions filled in with black" and the "regions filled in with white".

Further, in the case of the first embodiment, the dot pattern for generating a user-defined character, which corresponds to a portion composing a character or the like, is displayed as a positive image. Further, the guide display area is basically displayed as a negative image. Conversely, in the case of another embodiment of the present invention, the dot pattern for generating a user-defined character may be displayed as a negative image and moreover, the guide display area may be displayed as a positive image.

In addition, in the case of the first embodiment, the present invention is applied to the tape printing device. However, the present invention can be applied to another character information processor having the functions concerning user-defined characters, for example, a seal making device. The techniques of the "black-painting" and "white-painting" editing modes and of the guide display can be applied to another character information processor in which a dot pattern of only one size is employed for generating each user-defined character.

Although the preferred embodiments of the present invention have been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. A character information processor for generating and registering dot patterns of a plurality of sizes of a user-defined character, wherein a dot pattern of a predetermined larger size is generated by enlarging a dot pattern of a size smaller than the predetermined size, displaying the enlarged dot pattern and, subsequently, modifying the displayed enlarged dot pattern to complete generation of the dot pattern of the predetermined size, the character information processor comprising:

dot pattern generating means for generating or modifying each of the dot patterns of the plurality of sizes in response to an operation performed by a user;

enlargement conversion means for performing an enlargement conversion from a generated dot pattern of a smaller one of the plurality of sizes to a plurality of tentative dot patterns of larger sizes, each of the tentative dot patterns of the larger sizes being employed as an initial dot pattern of the corresponding larger size for said generating means to modify and generate a completed dot pattern of the corresponding larger size, a smaller one of said plurality of dot patterns of larger sizes being said predetermined size; and control means for causing the enlargement conversion means to further perform an enlargement conversion from a completed dot pattern of said predetermined size to a substitute tentative dot pattern of a further larger size in response to the dot pattern generating means completing the generation of the dot pattern of the predetermined size, whereby the substitute tentative dot pattern of the further larger size is used by said generating means to modify and generate a completed dot pattern of the further larger size.

2. A character information processor according to claim 1 wherein said dot pattern generating means includes:

first user-defined character dot-pattern editing means for editing the dot pattern of a selected size representing the user-defined character by changing user selected dots of the dot pattern representing the user-defined character into an on-dot or an off-dot;

second user-defined character dot-pattern editing means for editing the dot pattern of a selected size representing the user-defined character by collectively changing all dots of a user designated area of the dot pattern representing the user-defined character into on-dots; and third user-defined character dot-pattern editing means for editing the dot pattern of a selected size representing the user-defined character by collectively changing all dots of a user designated area of the dot pattern representing the user-defined character into off-dots.

3. A character information processor according to claim 1 and further comprising:

display control means for displaying a drawing display area, on which the dot pattern is drawn, and an outer display area provided on the outside of the drawing display area and distinguised from the drawing display area, said display control means displaying pointers in the outer display area moving in correspondence with movement of a cursor representing an object dot to be operated in the drawing display area, said pointers defining vertical and lateral lines which pass through the cursor to indicate the position of the cursor.

4. The character information processor according to claim 3, wherein the display control means is adapted to change a size of the drawing display area according to a size of the dot pattern to be generated.

5. A character information processor for generating and registering a dot pattern representing a user-defined character, comprising:

memory means having: a dot-pattern-in-preparation storage portion for storing a dot-pattern representing a user-defined character in preparation therein; and a user-defined character registration portion for storing a generated dot pattern representing a user-defined character therein;

dot-pattern generating means for generating a dot pattern of a first size representing a user-defined character and for storing the generated dot pattern of the first size in a first region of the dot-pattern-in-preparation storage portion;

enlargement/storage means for enlarging the dot pattern of the first size stored in the first region of the dot-pattern-in-preparation storage portion to a dot pattern of a second size, a dot pattern of a third size and a dot pattern of a fourth size and for storing the dot pattern of the second size, the dot pattern of the third size and the dot pattern of the fourth size in corresponding second, third and fourth regions of the dot-pattern-in-preparation storage portion;

modification/storage means for enabling user modification of the dot pattern of the second size and the dot pattern of the third size which are stored in the second and third regions of the dot-pattern-in-preparation storage portion, respectively, and for storing the modified dot pattern of the second size and the modified dot pattern of the third size in the corresponding second and third regions of the dot-pattern-in-preparation storage portion;

registration instructing means for issuing an instruction to register the modified dot patterns, which are stored in the dot-pattern-in-preparation storage portion, in the user-defined character registration portion;

said enlargement/storage means, when the modified dot pattern of the second size is stored in the second region of the dot-pattern-in-preparation storage portion, enlarging the modified dot pattern of the second size to thereby obtain a modified dot pattern of the fourth size and and storing the modified dot pattern of the fourth size in the fourth region of the dot-pattern-in-preparation storage portion;

said modification/storage means enabling user modification of the modified dot pattern of the fourth size stored in the fourth region of the dot-pattern-in-preparation storage portion and storing the user modified dot pattern of the fourth size in the fourth region of the dot-pattern-in-preparation storage portion; and registration means for storing the dot pattern of the first size and the modified dot pattern of the second size and the modified dot pattern of the third size and the user modified dot pattern of the fourth size, which are stored in the first, second, third and fourth regions of the dot-pattern-in-preparation storage portion, in corresponding regions of the user-defined character registration portion according to the registration instruction.

6. The character information processor according to claim 5, wherein the dot pattern generating means comprises:

first user-defined character dot-pattern editing means for editing the dot pattern of a selected size representing the user-defined character by converting selected dots of the dot pattern represented by a cursor on a screen of a display unit into an on-dot or an off-dot and changing a logical level of a corresponding dot of the dot pattern stored in the dot-pattern-in-preparation storage portion into a logical level of an on-dot or an off-dot;

second user-defined character dot-pattern editing means for editing the dot pattern of a selected size representing the user-defined character by collectively changing all dots of an area, which is defined by two diagonally opposite vertexes designated by a user on the screen of the display unit to be filled in with black, of the dot pattern representing the user-defined character into on-dots and for changing a logical level of a corresponding dot of the pattern stored in the dot-pattern-in-preparation storage portion into a logical level of an on-dot; and third user-defined character dot-pattern editing means for editing the dot pattern of a selected size representing the user-defined character by collectively changing all dots of an area, which is defined by two diagonally opposite vertexes designated by a user on the screen of the display unit to be filled in with white, of the dot pattern representing the user-defined character into off-dots and for changing a logical level of a corresponding dot of the dot pattern stored in the dotpattern-in-preparation storage portion into a logical level of an off-dot.

7. The character information processor according to claim 5, which further comprises display control means for displaying a drawing display area, on which the dot pattern is drawn, and an outer display area provided on the outside of the drawing display area and distinguished from the drawing display area, said display control means displaying pointers in each of the vertical and lateral segments of the outer display area moving in correspondence with movement of a cursor representing an object dot to be operated in the drawing display area, said pointers defining vertical and horizontal lines which pass through the cursor to indicate the position of the cursor.

8. The character information processor according to claim 7, wherein the display control means is adapted to change a size of the drawing display area according to a size of the dot pattern to be generated.

* * * * *